US007339932B2

(12) United States Patent
Tokuhara

(10) Patent No.: US 7,339,932 B2
(45) Date of Patent: Mar. 4, 2008

(54) COMMUNICATION SYSTEM AND MOBILE COMMUNICATION STATION USED FOR THIS COMMUNICATION SYSTEM

(76) Inventor: Tsunemi Tokuhara, 3-19-6, Sakaechoh, Kodaira-shi, Tokyo (JP)

( * ) Notice: Subject to any disclaimer, the term of this patent is extended or adjusted under 35 U.S.C. 154(b) by 685 days.

(21) Appl. No.: 10/839,291

(22) Filed: May 6, 2004

(65) Prior Publication Data

US 2005/0018628 A1 Jan. 27, 2005

(30) Foreign Application Priority Data

Jul. 23, 2003 (JP) ............................. 2003-278054

(51) Int. Cl.
*H04L 12/28* (2006.01)
*H04B 7/185* (2006.01)

(52) U.S. Cl. ...................... 370/392; 370/315; 370/328; 370/345; 455/13.1; 455/18; 455/7

(58) Field of Classification Search ................ 370/328, 370/310, 316, 278, 351, 392, 236, 315, 345; 455/7, 9, 18, 13.1
See application file for complete search history.

(56) References Cited

U.S. PATENT DOCUMENTS 7,075,979 B2 * 7/2006 Beadle et al. ............... 375/222
7,158,501 B2 * 1/2007 Kasami et al. .............. 370/339
2002/0186693 A1 * 12/2002 Inoue et al. ................ 370/389
2003/0035438 A1 * 2/2003 Larsson ...................... 370/466
2003/0235193 A1 * 12/2003 Hosaka ....................... 370/389

* cited by examiner

*Primary Examiner*—George Eng
*Assistant Examiner*—Huy Phan
(74) *Attorney, Agent, or Firm*—Wenderoth, Lind & Ponack, L.L.P.

(57) ABSTRACT

A communication system and mobile communication station used in a communication system with low installation cost and no base station. The communication system performs radio communication by communicating a packet among numerous mobile communication stations in an expandable way by providing a relay function in a portable mobile communication station. Each mobile communication station comprises a packet reception means, a packet judging means for judging if the received packet is the self relative address or not, a relay means for transmitting the received packet when the received packet is not the self relative address, a means for generating packets, and a means for transmitting the generated packet. The packet relay means transmits the received packet in a random timing.

11 Claims, 10 Drawing Sheets

18
(A)
(B)
(C)
(D)
(E)
48 header unit
unique word
first departure address
terminal address
first departure serial No.
relay count
classification code
header error correction
data A
data error correction
54
56
58
60
62
64
66
50
data length
protocol classification
sub-data
72
R
(just before) transmission address
next receiving address
74
76
RA
RD
data B
70

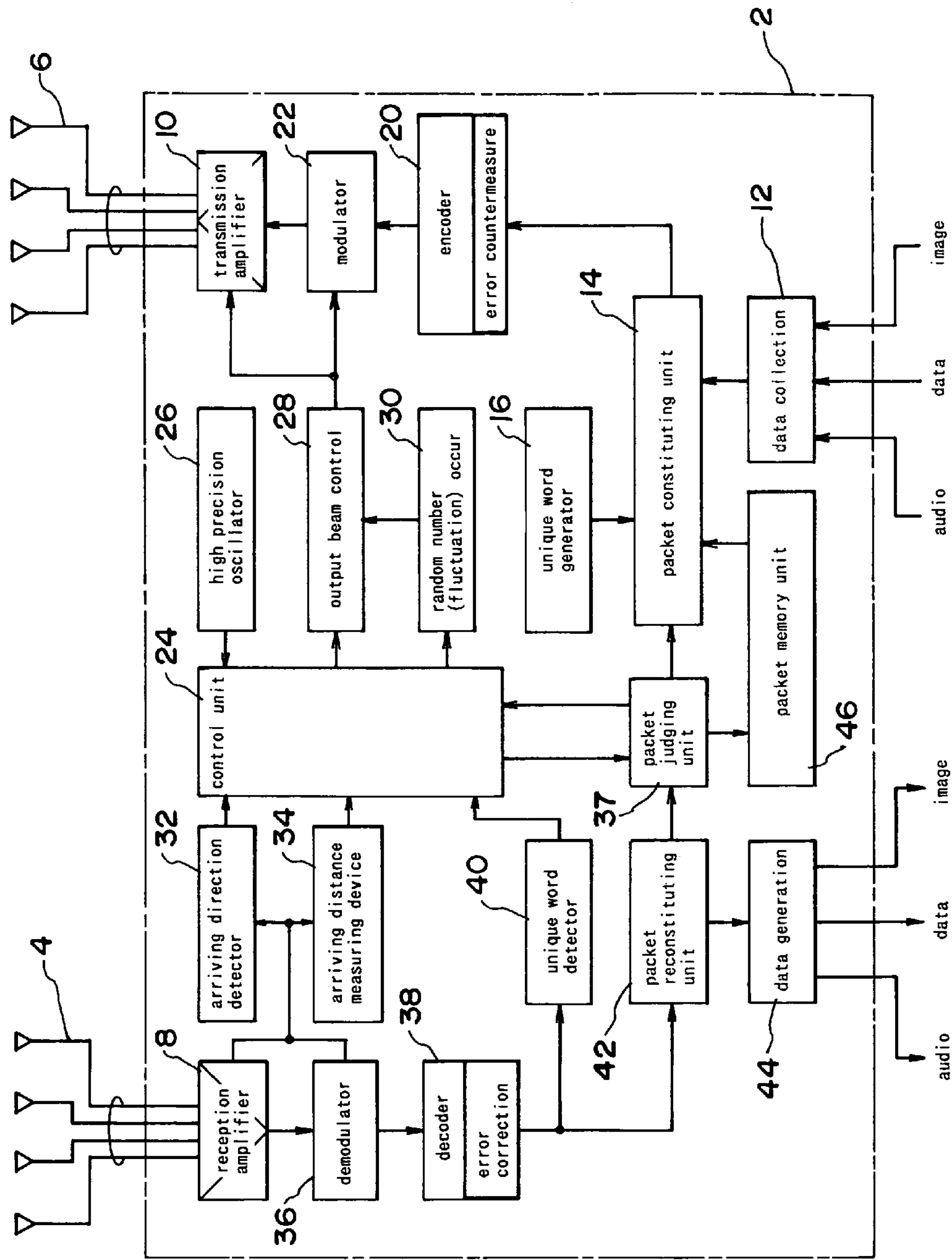
FIG. 3
transmission amplifier
modulator
encoder
error countermeasure
high precision oscillator
output beam control
random number (fluctuation) occur
unique word generator
packet constituting unit
data collection
image
data
audio
control unit
packet judging unit
packet memory unit
arriving direction detector
arriving distance measuring device
unique word detector
packet reconstituting unit
data generation
reception amplifier
demodulator
decoder
error correction
2
4
6
8
10
12
14
16
20
22
24
26
28
30
32
34
36
37
38
40
42
44
46

COMMUNICATION SYSTEM AND MOBILE COMMUNICATION STATION USED FOR THIS COMMUNICATION SYSTEM

BACKGROUND OF THE INVENTION

The present invention relates to radio communication system and mobile communication station used for a communication system.

Heretofore, as it is disclosed in the official gazette of Japanese Patent Kokai-Koho Kai 2000-49690, in order to substantially expand a communicable area by restraining a rise of system costs, a portable telephone set has been known to the public. The portable telephone set comprises a normal reception unit, a normal transmitting unit, an inputting means, a reception unit, a transmission unit, and a control unit. The normal reception unit receives communication information at normal communication times as a portable telephone set; and the normal transmitting unit transmits the communication information at normal times. The inputting means inputs at least a propriety of setting communication for outside area and the reception unit is for outside area to receive and detect an area outside code. The transmission unit is for area outside to transmit the communication information at area out time. Additionally, the control unit performs a system control of the control unit. This mobile telephone set performs a normal communication of a reception information to its local station with a calling side in case it is located in the communicable area with a base station. However, in cases when the reception information is not to the local station, the mobile telephone set performs a relay operation by attaching a relay code. And in cases in which the mobile telephone set is located in area outside capable of communicating with the base station, the reception information to the self station performs a normal communication by attaching an area outside code with the calling side. Finally, in cases where it is not the reception information communicated to the self station, the mobile telephone set performs a relay operation with the area outside by attaching a relay code.

In the conventional portable telephone relay system, the existing communicable area can be expanded without bringing about an increase of the existing base stations. However, the presence of the base station is indispensable, and costs for installation of the facilities is expensive. Additionally, the increased cost gives rise to a burden of the costs to the subscribers. Furthermore, at an emergency time, call concentration upon a specific base station tends to cause an inability to communicate.

An object of the present invention is to solve the foregoing problems.

SUMMARY OF THE INVENTION

The present invention relates to a communication system for performing a radio communication using packets to numerous mobile stations in an expandable area, and including a provision for providing a relay function to portable mobile stations. Each mobile stations comprises a packet reception means, a packet judging means, a packet relay means, a generating means, and a transmitting means. The packet reception means is for receiving packet, and the packet judging means is for judging if the received packet is self set or not. The packet relay means is for transmitting the received packet when the received packet is not to the self set and the packet received is not identical with the packet received in the past. The generating means is for generating a packet, and the transmitting means is for transmitting the generated packet. Additionally, the packet relay means transmits the received packet at a random timing.

BRIEF DESCRIPTION OF DRAWINGS

FIG. 3 shows a block explanation drawing showing a structure of interior of a mobile station.

DETAILED DESCRIPTION OF THE INVENTION

Figure 1:
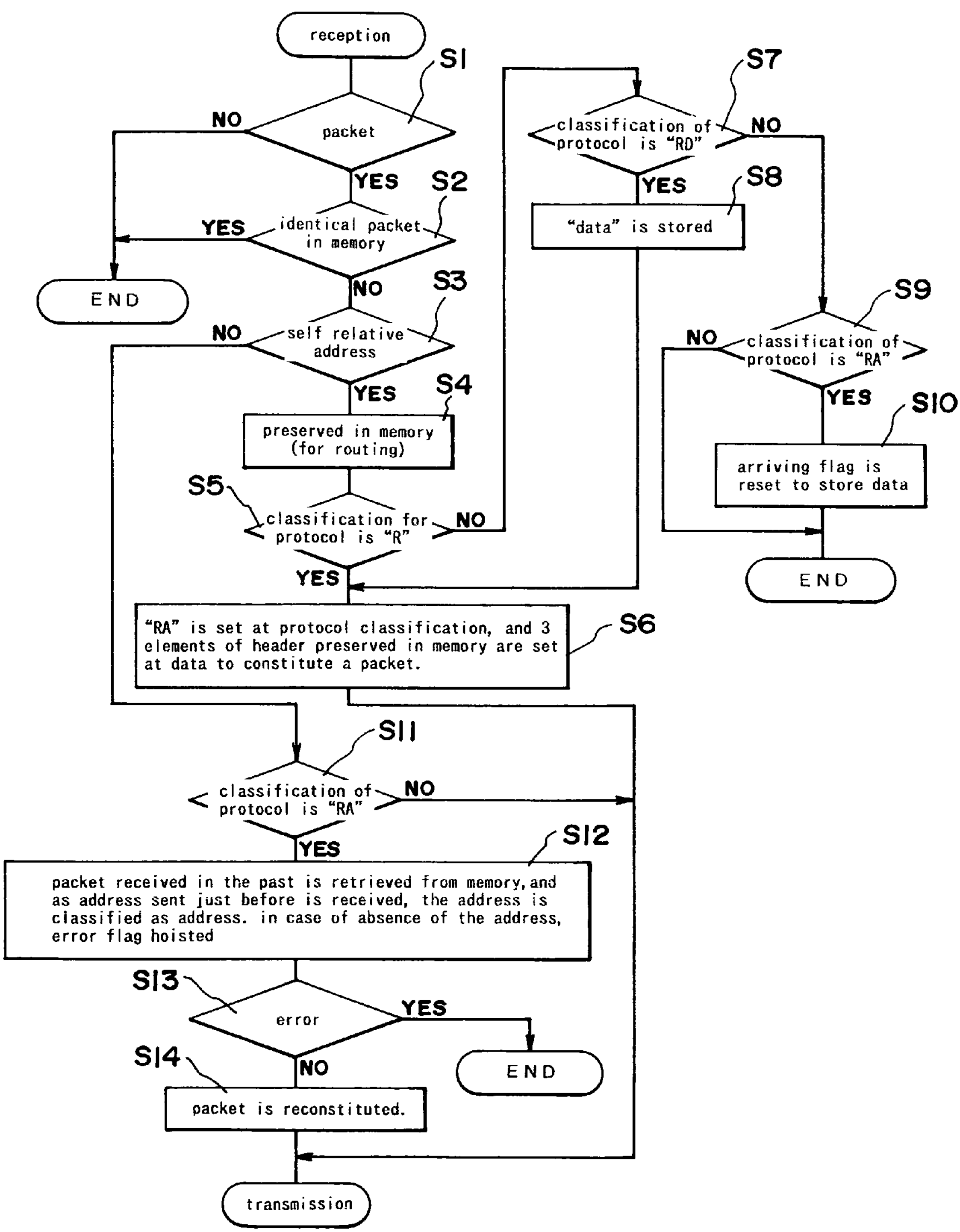
FIG. 1 shows a flow chart showing an operation of a communication system according to the present invention.

The best mode of carrying out the present invention is described with reference to the following drawings.

FIG. 3 shows an internal structure of a mobile station 2 provided with a function of a portable telephone set used in a communication system. As shown in FIG. 3, the mobile station 2, includes an adaptive array antenna 4 for reception and an adaptive array antenna 6 for transmission are mounted to the mobile station 2. The antenna 4 for reception is connected to a reception amplifier 8, and the antenna 6 for transmission is connected to a transmission amplifier 10. A data collection unit 12 is connected to an input unit (illustration is omitted) for processing audio signals such voice or the like or data and image signals.

The data inputted to these input units are received by the data collection unit 12, as input signals outputted from these input units. The input units supply the input signals to a packet constituting unit 14. The packet constituting unit 14 generates a packet 18 shown in FIG. 2 on the basis of the input signals and signals from the unique word generator 16. Also, the packet constituting unit 14 is connected to a transmission amplifier 10 by means of an encoder 20 and a modulator 22. Reference numeral 24 shows a control unit, and an application for controlling this system and a variety of communication control programs are stored in the control unit. The control unit 24 is connected to a high precision oscillator 26, output beam control unit 28, random number (fluctuation) generating unit 30, a radio wave arriving direction detector 32, a radio wave arriving distance measuring unit 34 and a packet judging unit 36 are connected.

The reception amplifier 8 is connected to a unique word detector 40 and a packet reconstituting unit 42 by means of a demodulator 36 and a decoder 38. The packet reconstituting unit 42 reconstitutes a packet by changing the data of the received packet or adding the data by the control of the control unit 24. The data generating unit 44 converts the packet to voice or character data or image and outputs it to an output device (illustration is omitted). The packet judging unit 37 gives a decision on classification of the packets and the like by the control of the control unit 24. A packet judging unit 36 is connected to a packet memory unit 46, and the packet memory unit 46 is connected to the packet constituting unit 14.

Figure 4:
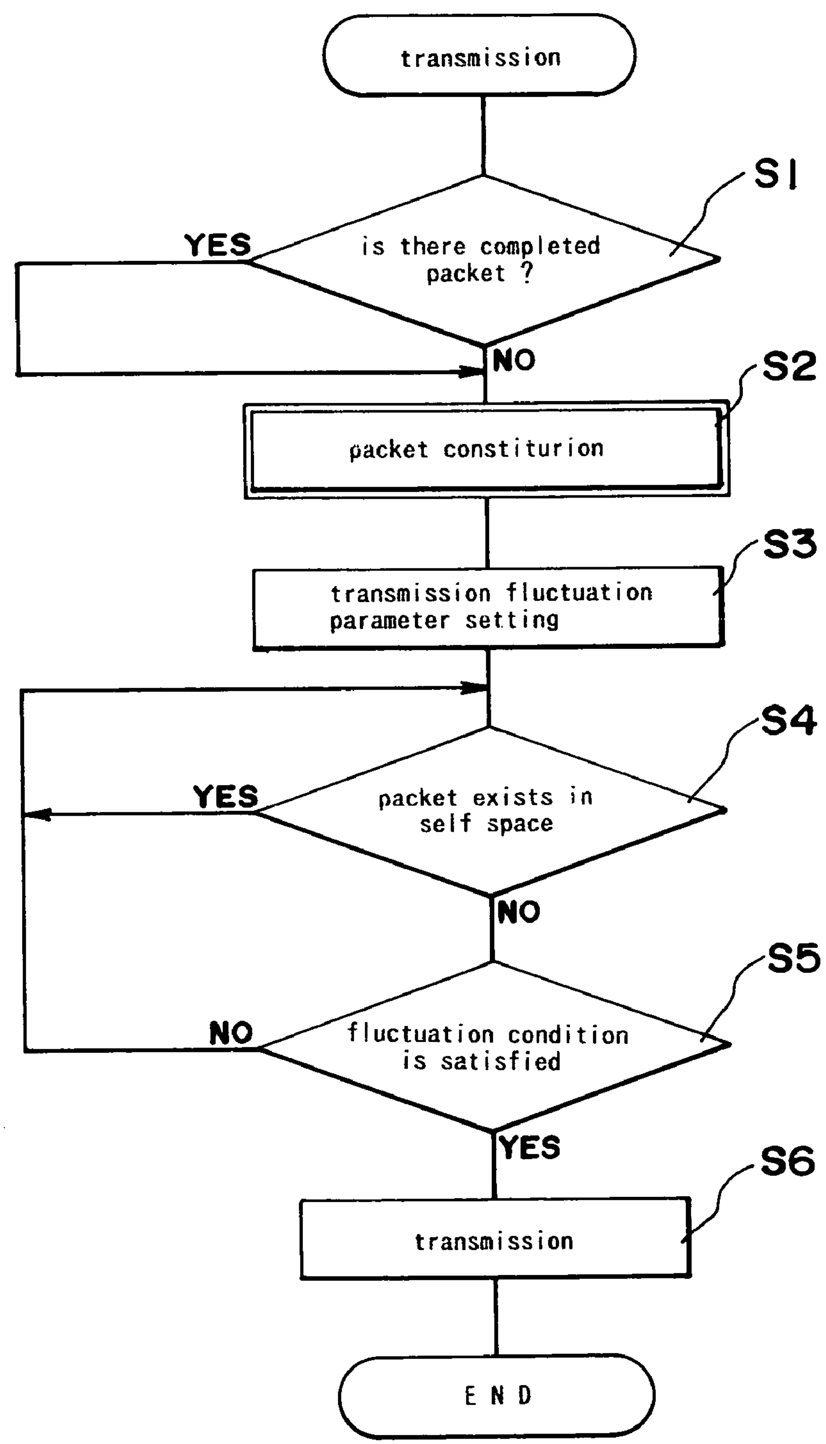
FIG. 4 shows a flow chart showing an operation of the communication system according to the present invention.

Next, as shown in FIG. 4, a main operation of the transmission will be described by referring to a transmission main flow.

Figure 2:
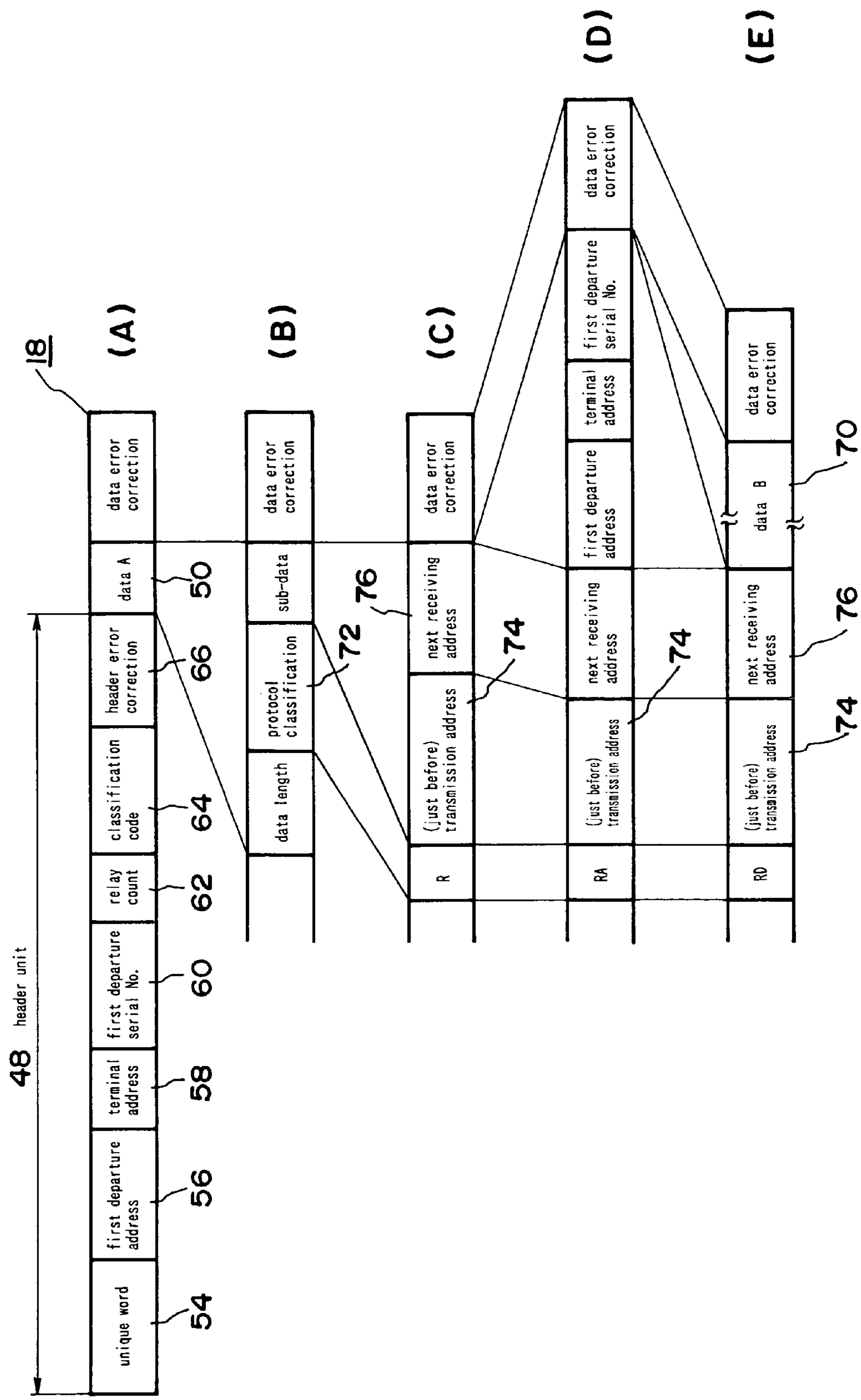
FIG. 2 shows an explanation drawing of a packet.

The control unit 24 of the mobile station 2 (hereinafter referred to mobile station is called briefly as MS) constitutes a packet 18 (step 2) by judging if there is a completed packet or not (step 1) in the first place once a mode of the transmission is entered, and by controlling the packet constituting unit 14. The packet 18 constituted by the packet constituting unit 14 comprises a header unit 48 a data unit 50 and a data error correction unit 52, as shown in FIG. 2. The header unit 48, comprises a unique word unit 54, first departure address unit 56, terminal address unit 58, first departure serial No. unit 60, relay count unit 62, classification code unit 64, and header error correction unit 66. The unique word to be stored in the unique word unit 54 is used for detection of the packet, a direction of packet (radio wave), confirmation of time difference and detection of version of the packet.

The first departure address to be stored in the first departure address unit 56 is an address of the MS 2 that is initially transmitted. The first departure serial No. adds 0 to the initially transmitted packet, and adds sequentially +1 to the packet to be transmitted. The relay count 62 is 0 when the transmission is made in the first place, and when it is relayed, adds +1. The classification code shows a kind of the packets, 0 shows an absence of the data unit, and 1 shows a presence of the data unit. When the packet 18 is constituted in the step 2, the control unit 24 next sets (step 3) a direction of beam of the antenna array 6, magnitude of beam electric power, and a transmission parameter for determining a timing of a transmission of the beam output by the random number. Next, the control unit 24 judges (step 4) if a packet exists in a self space. This judgement is for safely holding other packets in a timewise and frequency-wise channel with respect to self transmission. The self space means a space around an environment of the reception antenna 4, and when the reception antenna 4 receives the other packet, it means that the other packet is present in the self space.

When the other packet is present in the self space, in case of transmitting the self packet, batting may occur between the self transmitting packet and the other packet in the self space. In cases in which the packet is absent in the self space, the control unit 24 judges (step 5) if the condition of timing of transmission of the packet is fulfilled. When it is judged as it being fulfilled, the packet 18 is transmitted (step 6) to the outer space by controlling a random number generating unit 30 and an output beam control unit 28 on the basis of the set transmission parameter. The timing of the transmission of the packet is determined by the random number, and the fluctuation is applied to the beam output of the array antenna 6 by this random number, and the packet is transmitted in the condition resembling the natural phenomenon. The fluctuation property wherein the timing of this transmission is not made a rule is particularly important when the MS functions as the relay repeater. In cases when many MS 2 simultaneously receive specific packets and the received packets are simultaneously transmitted, the packets themselves cause an interference. The fluctuation of the packet transmission avoids this phenomenon.

Figure 5:
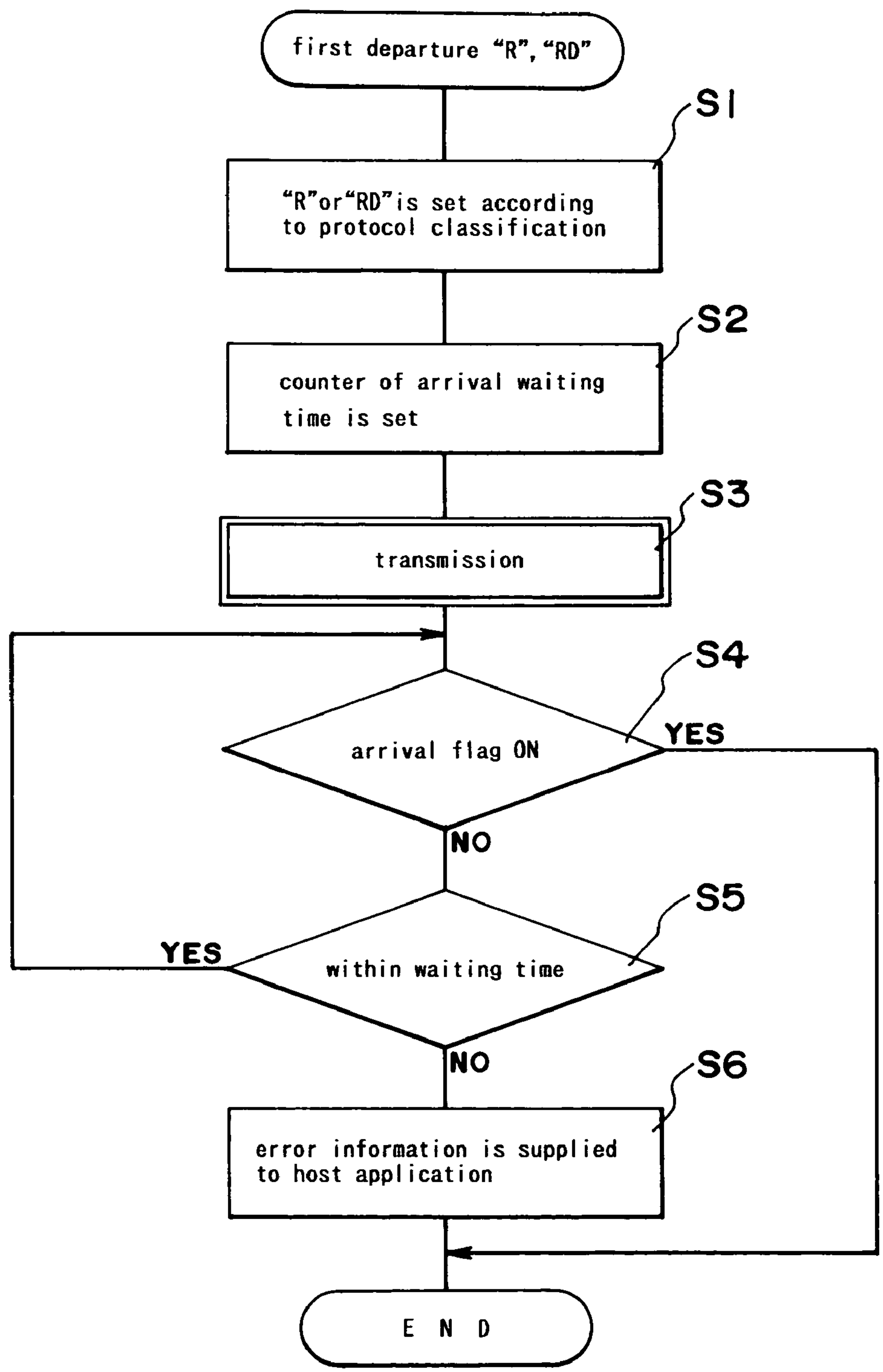
FIG. 5 shows a flow chart showing an operation of a communication system according to the present invention.

The operation of the MS that causes first departure of the packet transmits R request and RD request is described as follows by referring to the flow chart of FIG. 5.

Herein, the R denotes Routing Request by the packet not attached with the data B70 of contents of the communication such as voice or the like. And the RD denotes Routing Request & Data by the packet attached with this data B70. The control unit 24 sets (step 1) the R or the RD according to the protocol of the packet when entering the R, RD first departure mode. Next, the control unit 24 sets (step 2) an arrival waiting time counter in the MS, and transmits (step 3) the packet. Next, the control unit 24 judges (step 4) the arriving flag in the memory in the MS is ON or not. When it is judged affirmatively, the processing is completed. When the negative judgement is given by the step 4, next, it is judged (step 5) if the arrival is within the waiting time. When it is judged that the arrival is beyond the waiting time, an error information is applied (step 6) to the host application, for example, the application of conversation, and the processing is completed.

The retransmission is to be determined by the application of the host layer.

Figure 6:
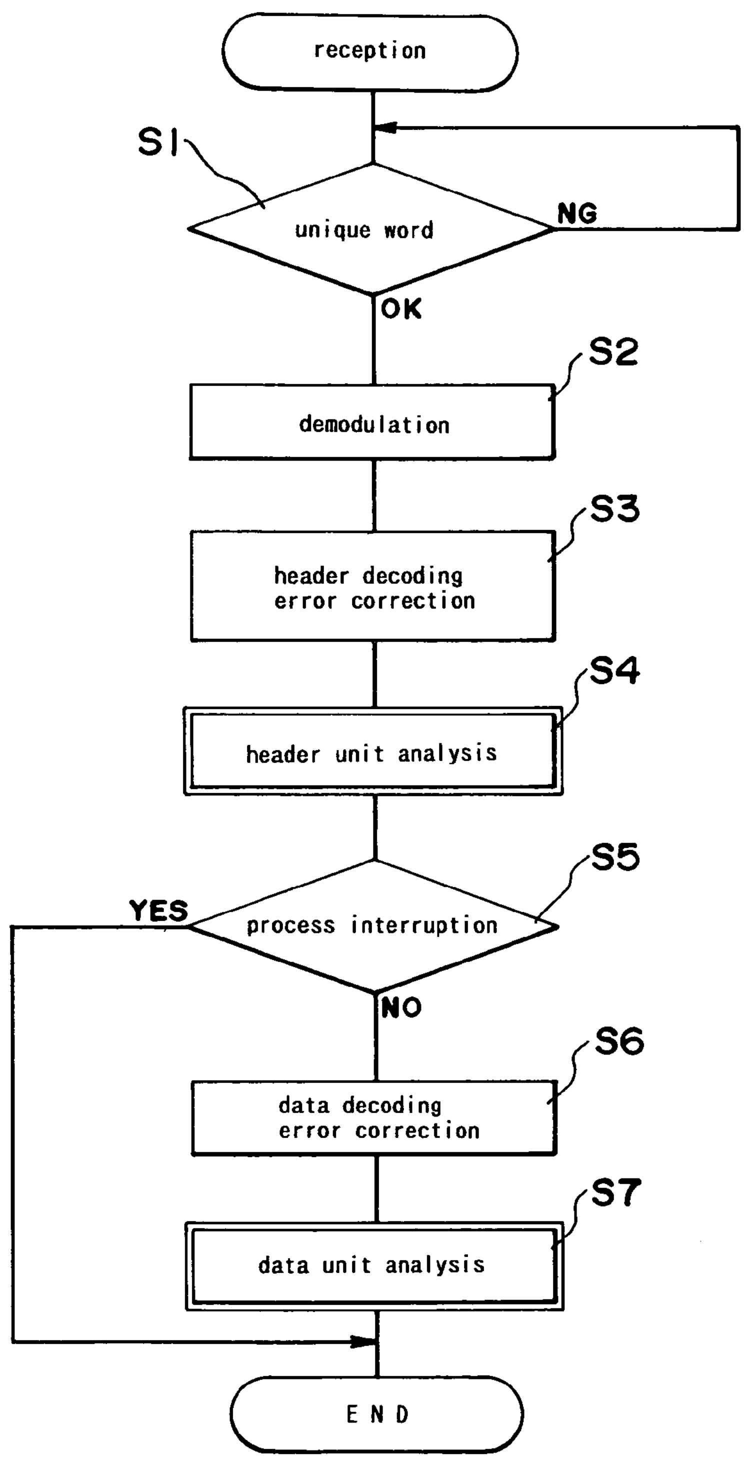
FIG. 6 shows a flow chart showing an operation of the communication system according to the present invention.

Next, the main flow of reception common to the case of the packet being only the header, and the case of the classification of the packet are R, RA, RD will be described by referring to FIG. 6. Wherein the protocol classification RA means Acknowledge (Routing Request Acknowledge).

When the MS control unit 24 enters the mode of the reception, the received packet judges (step 1) if the unique word is contained or not, and when it judges affirmatively, the packet is demodulated (step 2). Next, the control unit 24 controls a decoder 38, and performs (step 3) the decoding of a header unit 48 and the error correction, and analyzes (step 4) the header unit 48.

Next, the control unit 24 judges (step 5) if the processing is to be interrupted or not, and when the reasons for the interruption are recognized such as the presence of the error in the packet, or the header only is found and no data unit is present, or the packets are duplicated, or the number of relays in the packets exceeds the set value, the processing is interrupted. In case these reasons for the interruption are not found, the control unit 24 performs (step 6) the decoding of the data and the error correction, and performs (step 7) the analysis of the data unit.

Figure 7:
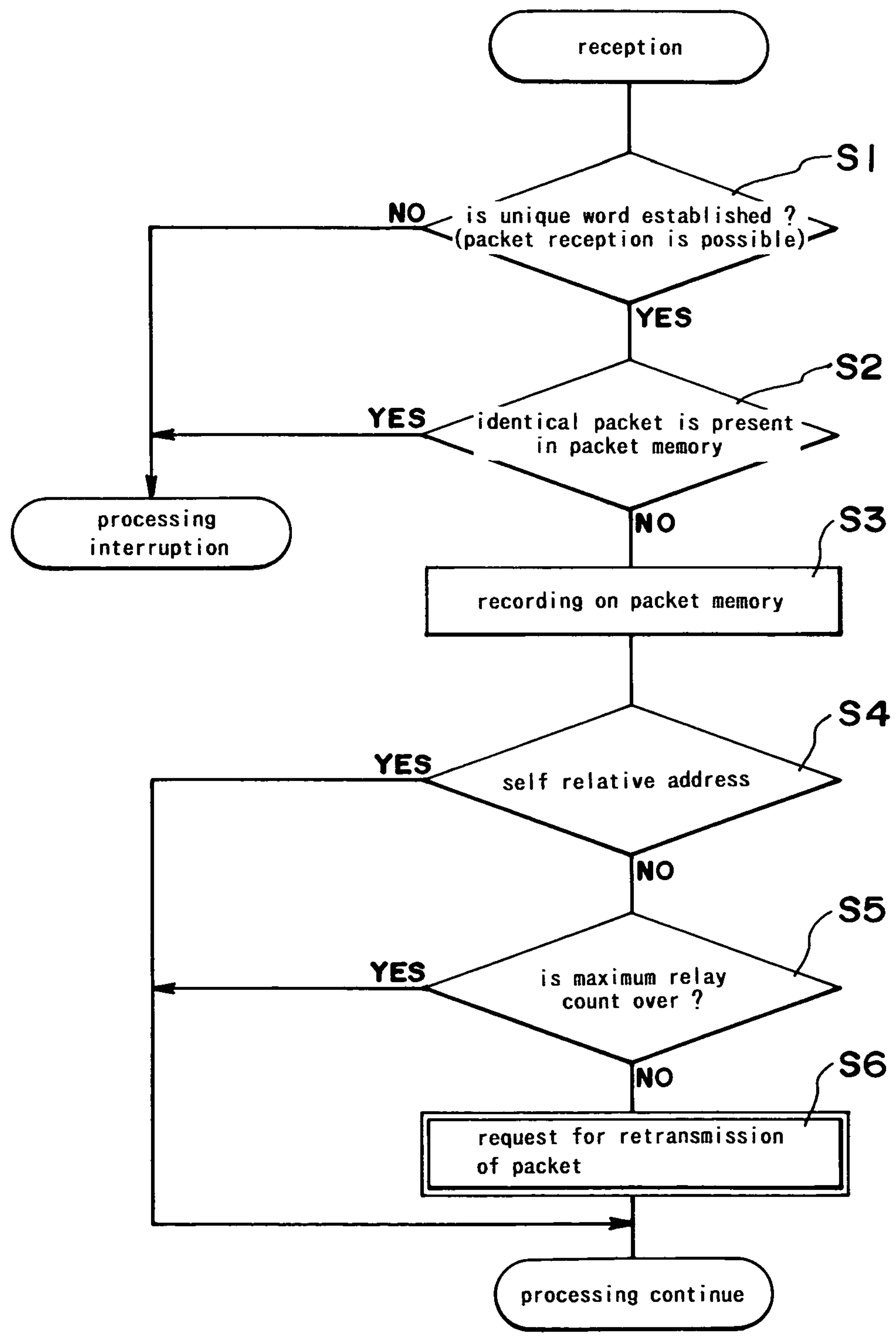
FIG. 7 shows a flow chart showing an operation of the communication system according to the present invention.

The operation of the analysis of the header unit will be described by referring to the FIG. 7.

The control unit 24 judges (step 1) if the unique word is established or not on the basis of a signal of a unique word detector 40 when the reception mode enters. When the affirmative judgement is made, the packet judging unit 37 judges (step 2) if there is an identical packet in a packet memory unit 46. The presence or absence of the identical packet checks three elements of the packets such as the first departure of the packet, terminal address, and first departure serial number.

Next, the received packet is recorded (step 3) in the packet memory unit 46.

Next, the control unit 24 judges if the packet has the self relative address or not, and when the affirmative judgement is made, the processing continue mode goes on. When the negative judgement is made in step 4, the control unit 24 judges (step 5) if the packet exceeds a maximum relay count by the packet judging unit 37. When the negative judgement is made by the control unit 24, a packet retransmission request is transmitted to the control unit 24 from the packet judging unit 37. When this request is sent to the control unit 24, the control unit 24 shifts (processing continues) to the transmission processing of the flow chart as shown in FIG. 4.

Next, the operation of sending the acknowledge with the protocol of RA when the protocol classification of the self relative packet is R will be described by referring to the flow chart of FIG. 1.

When the MS receives the packet 18 on the basis of the unique word by the reception antenna 4, the control unit 24 judges (step 1) if the packet is established or not. The establishment of the packet in this stage explains the condition where the unique word is established, and the error of the packet is corrected, and the data is totally confirmed. When the packet is established, next, the control unit 24 judges (step 2) if the identical packet is present in the packet memory unit 46. The identical packet confirms that all of the first departure address, terminal address, and first departure serial No. are entirely identical.

When the identical packet is not present in the packet memory unit 46, the control unit 24 judges (step 3) if the received packet is the self relative address or not from the data of the terminal address 58 of the packet 18. If it is the self relative packet, the packet is stored (step 4) in the packet memory unit 46. Next, the control unit 24 judges (step 5) if a protocol classification unit 72 in a data unit 50 of the received packet is "R" or not. In the protocol classification, there are R, RD, RA, and R (request) or RD (request with data) used as a pair with the protocol classification RA (acknowledge). When the control unit 24 judges (step 6) that the protocol classification of the packet is not "R", the control unit 24 judges (step 7) if the protocol classification is "RD", namely, the request with call data or not. When the affirmative judgement is made, the call data B70 is stored (step 8) in the memory, and the process shifts to the step 6.

When the protocol classification is not "RD", the protocol classification judges (step 9) if it is "RA" or not and the affirmative judgement is made, the control unit 24 sets the arrival flag in the memory ON, and stores (step 10) the data. When the affirmative judgement is made by the control unit 5 in the judgement step 5, next, the control unit 24 sets "RA" in the protocol classification unit 72 as shown in FIG. 2(D). Three elements of the header (first departure address, terminal address, first departure serial No.) stored in the packet memory unit 46 are set in the data unit A50 of the received packet to constitute (step 6) the packet 18.

Next, the control unit 24 transmits (step 15) the packet. When the control unit 24 judges the negative in the foregoing step 3, next, the control unit judges (step 11) if the protocol classification of the received packet is "RA" or not. When the affirmative judgement is made, next, the control unit 24 retrieves the identical packet received in the past from the memory, and changes a just before transmitted address 74 of the identical packet to a next receiving address 76 of the packet of the received RA. In case the packet is not present, hoists (step 12) the error flag. Next, the control unit 24 judges (step 13) if it is the error or not, and when the negative judgement is made, reconstitutes (step 14) the packet and transmits (step 15) the packet.

Figure 8:
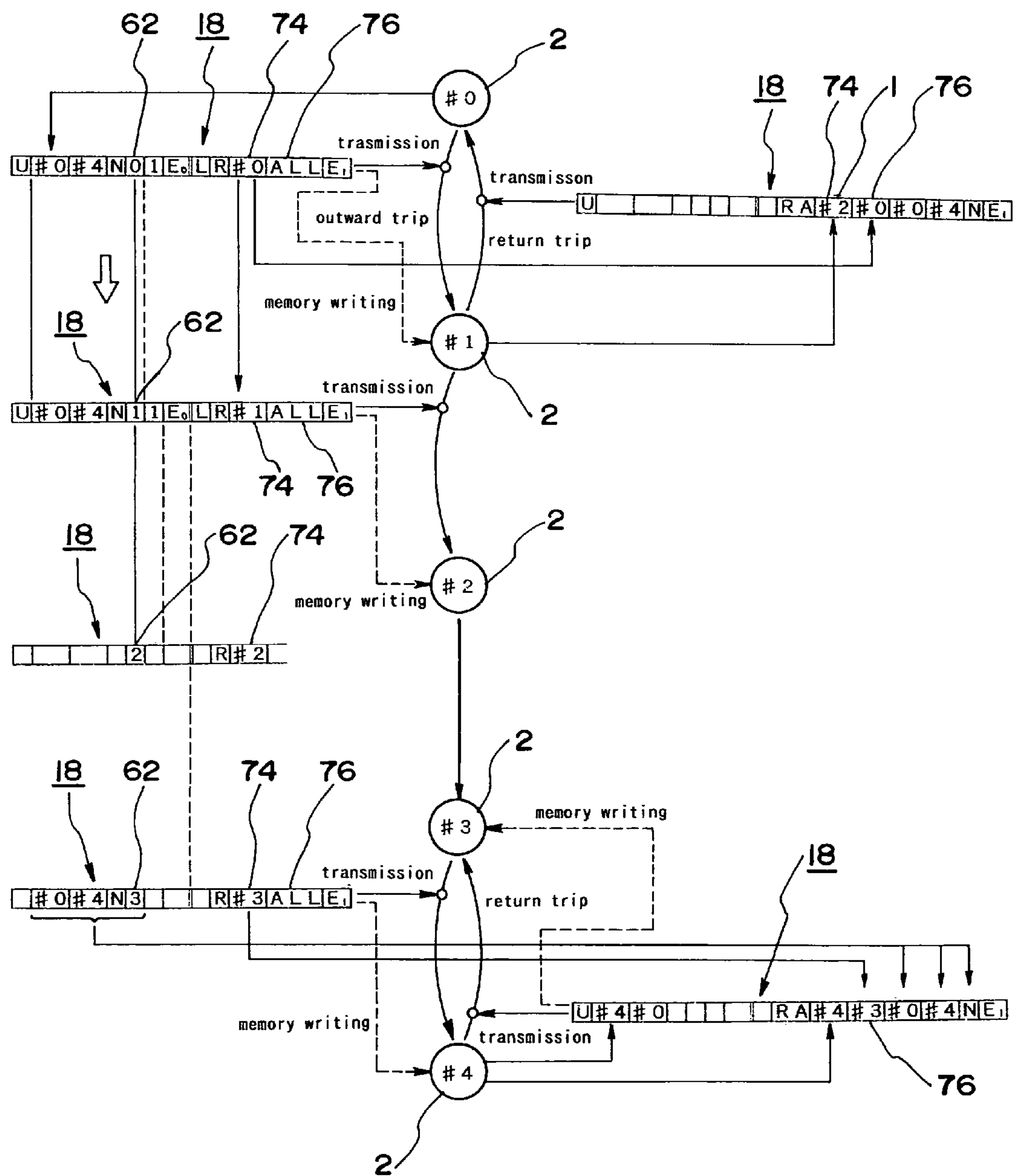
FIG. 8 is an explanation drawing showing an operation of the communication system according to the present invention.

Next, the basic routing algorithm will be described by referring to FIG. 8.

When the MS 2 of No. 0 transmits the packet 18 whose protocol classification is R to the address, the MS 2 of No. 4, the packet 18 is received at the MS 2 of No. 1 located nearby. The contents of the packet are stored in the memory at the address, and the relay count unit 62 of the packet 18 is made as "1", and (just before) transmitted address unit 74 is made as the address of the MS 2 of No. 1. In case the next receiving address unit 76 of the packet 18 is "ALL", it is the broadcasting. The MS 2 of No. 1 transmits the packet 18 that is reconstituted into this new data.

The peripheral MS 2 of No. 2 that receives the transmitted packet transmits the packet 18 by performing the similar processing. The relay count unit 62 of this packet 18 is renewed to "2". The MS of No. 3 that receives the packet 18 performs the similar processing to transmit the packet 18. The packet 18 is relayed by the peripheral MS 2 of No. 3 and arrives the MS 2 of No 4 of the terminal address.

When the MS 2 of No. 4 receives the self relative address packet 18, the packet 18 of the acknowledge (RA) is reconstituted wherein the MS of the self is made as the first departure address. And, the MS of No. 0 is made as the address, and the next receiving address 76 is made as No. 3 as shown in the drawing, and is transmitted towards the MS of No. 3 of the next receiving address. This packet 18 is in the drawing, and is transmitted towards the MS of No. 3 of the next receiving address. This packet 18 is provided with a data unit A50 comprising the protocol classification "RA", just before transmission address "No. 4", next receiving address "No. 3", first departure address "No. 0", and terminal address "No. 4", and first departure serial "No.N".

This first departure serial No. is constructed in that "0" is added to the packet that is initially transmitted and +1 is added to the different packets that are sequentially transmitted. The packet 18 of the protocol classification "RA" that is transmitted from the MS 2 of No. 4 has the MS 2 of No. 0 as the terminal address takes up a return route of counter direction against ongoing route of the packet 18 of the protocol classification "R" forming a pair with the foregoing packet 18, and is sequentially relayed like the MS of No. 3, the MS of No. 2 and the MS of No. 1, and reaches the MS of No. 0.

In the returning route, each MS of No. 3, No. 2 and No. 1 plays a role of router, and the just before transmission address 74 of the packet 18 to be transmitted from the MS of No. 1 is reconstituted as the No. 1 and next receiving address as "No. 0" as shown in the drawing. In FIG. 8, in case where the packet of the protocol classification "RA" is received in the MS other than the established routing, this MS hoists the error flag as shown in the step 2 of FIG. 1, and completes the reception processing, and does not perform the relay operation.

Figure 10:
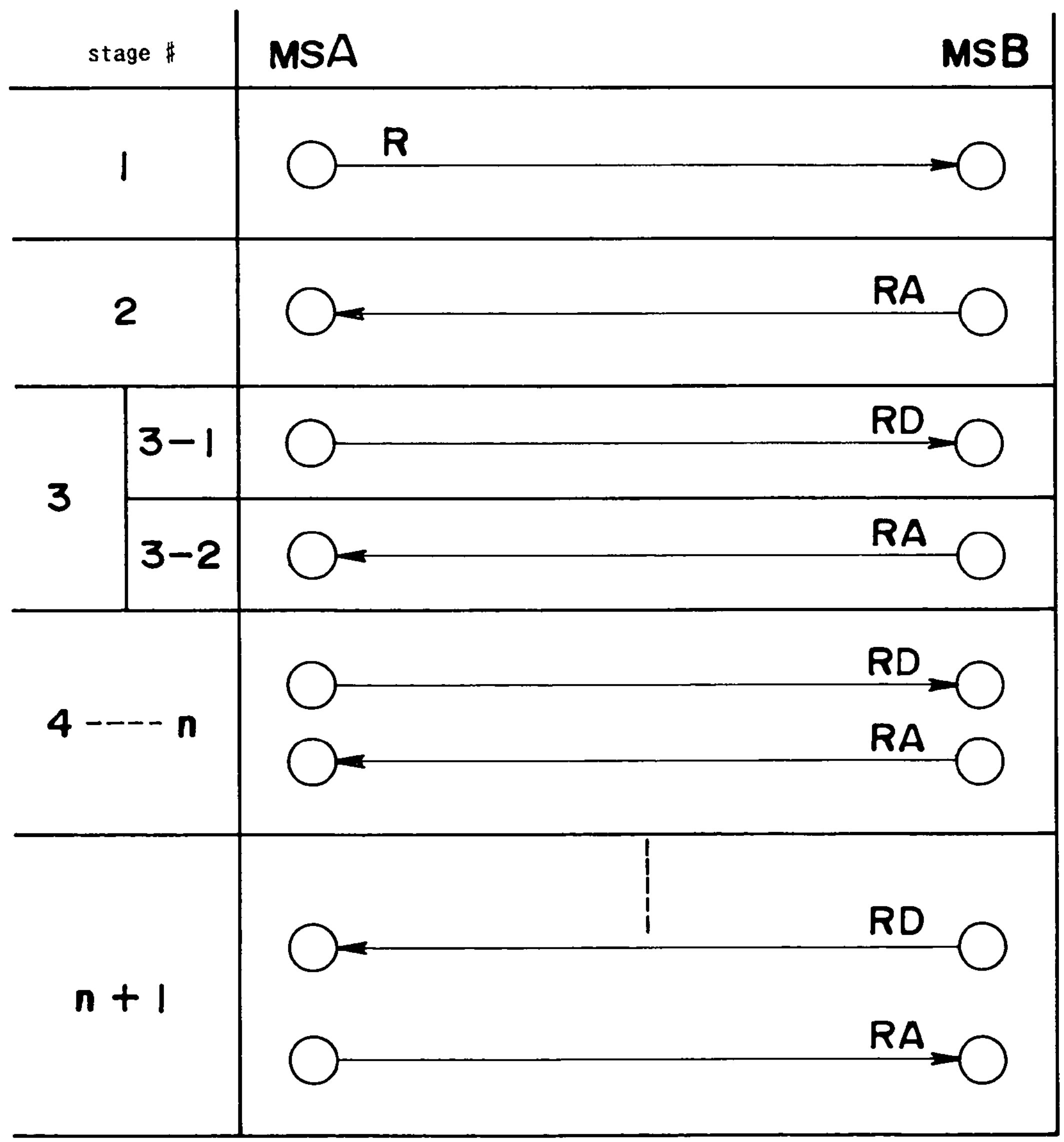
FIG. 10 is an explanation drawing of an operation of the communication system according to the present invention.

The foregoing operation will be described in the following by referring to FIG. 10 with reference to the case of exchanging the voice data.

In order to establish the routing between the first departure MSA station and the terminal MSB station, the MSA station of the first departure station transmits (stage 1) acknowledge request; namely, packet of R to the MAB station of the terminal station. The MSB station of the terminal station produces the packet RA for acknowledge and transmits (stage 2) the packet RA towards the MSA station that is the first departure station of R forming a pair with the foregoing station when receiving the packet R. As the routing is established in the stage 2, the MSA station transmits (stage 3-1) the package RD contained in the voice towards the MSB station. The MSB station transmits (stage 3-2) the reply RA against the package RD towards the MSA station. Likewise, the MSA station transmits (stage 4 . . . n) the packet RD attached with the voice data to the MSB station for necessary number of packets. For the exchange of voices between the MSA station and the MSB station, the transmission of the voices of counter direction towards the MSA station from the MSB station becomes necessary. The exchange of the voice data is accomplished (stage n+1) by arranging the packet RD with the voice data to move from the MSB station towards the MSA station.

Figure 9:
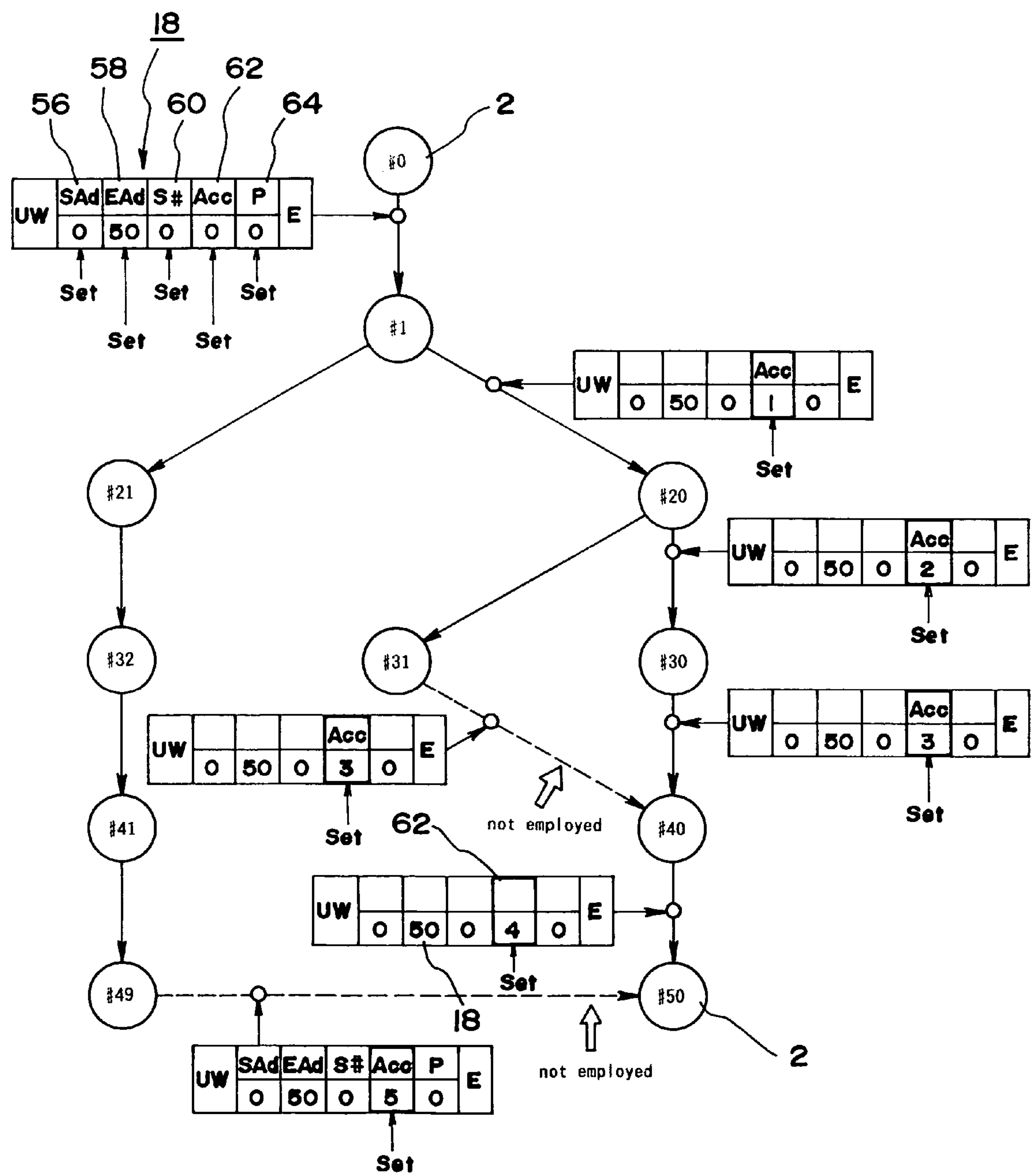
FIG. 9 is an explanation drawing showing an operation of the communication system according to the present invention.

Next, the transmission of only the part of the header unit of the packet will be described by referring to FIG. 9.

This transmission is carried out smoothly for the actual communication to be conducted subsequently with the intention of an initial setting as the network.

The MS 2 of No. 0 of the first departure is arranged as shown in the drawing that the header unit of the packet 18 is set like the first departure address unit 56 to be "No. 0", terminal address unit 58 is "No. 50", first departure serial No. unit 60 is "No. 0", relay count unit 62 is "0" and classification code unit 64 is "0".

This classification code unit 64 shows the kinds of the packet, and "0" shows "no data" and "1" shows "with data". The packet 18 transmitted from the MS 2 of No. 0 reaches the MS 2 of No. 50 through the various routes as shown in the drawing but the MS 2 of No. 50 becomes possible to set the shortest route with the MS 2 of No. 0 by the count value of a relay count unit 62 in the reached packet 18.

The present invention has been constructed as described in the foregoing so that this invention needs no base station, and the cost of the entire system can be made extremely low.

What is claimed is:

1. A communication system comprises: a relay function is provided in mobile communication station of portable type which performs a radio communication by packets among numerous mobile communication stations in an expandable area, each communication station comprising a packet means, a packet judging means for judging if the received packet is a self relative address or not, a packet relay means that transmits the received packet when the received packet is not the self relative address and when the received packet is not identical with a packet received in the past, a means for generating the packet, and a means for transmitting the generated packet.

2. A communication system according to claim 1, wherein the packet relay means is adapted to transmit the received packet at a random timing.

3. A communication system according to claim 2, wherein the packet relay means is arranged not to transmit the packet when the packet is to be transmitted or when the packet reception means receives the other packet.

4. A communication system according to claim 2, wherein the packet has a property of routing request or routing request acknowledge and the mobile communication station of the non-terminal address that receives the packet of routing request renews the address data of the just before transmitted addressed unit of the packet to the self address and transmits it, and the mobile communication station of the terminal address that receives the packet of routing request reconstitutes the packet, and attaches the property of routing request acknowledge to the reconstituted packet and transmits it, and the mobile communication station of the non-terminal address that receives the packet of routing request knowledge retrieves the identical packet that receives in the past, records the just before transmitted address of the identical packet to the next receiving address of the received routing request acknowledge packet, and transmits the routing request acknowledge packet to establish a routing between the first departure mobile communication station and the terminal mobile communication station.

5. A communication system according to claim 3, wherein the packet has a property of routing request or routing request acknowledge and the mobile communication station of the non-terminal address that receives the packet of routing request renews the address data of the just before transmitted addressed unit of the packet to the self address and transmits it, and the mobile communication station of the terminal address that receives the packet of routing request reconstitutes the packet, and attaches the property of routing request acknowledge to the reconstituted packet and transmits it, and the mobile communication station of the non-terminal address that receives the packet of routing request knowledge retrieves the identical packet that receives in the past, records the just before transmitted address of the identical packet to the next receiving address of the received routing request acknowledge packet, and transmits the routing request acknowledge packet to establish a routing between the first departure mobile communication station and the terminal mobile communication station.

6. A communication system according to claim 1, wherein the packet has a property of routing request or routing request acknowledge and the mobile communication station of the non-terminal address that receives the packet of routing request renews the address data of the just before transmitted addressed unit of the packet to the self address and transmits it, and the mobile communication station of the terminal address that receives the packet of routing request reconstitutes the packet, and attaches the property of routing request acknowledge to the reconstituted packet and transmits it, and the mobile communication station of the non-terminal address that receives the packet of routing request knowledge retrieves the identical packet that receives in the past, records the just before transmitted address of the identical packet to the next receiving address of the received routing request acknowledge packet, and transmits the routing request acknowledge packet to establish a routing between the first departure mobile communication station and the terminal mobile communication station.

7. A communication system according to claim 6, wherein the exchange of data such as conversation at the host layer of the communication protocol among the mobile communication stations is carried out that the package attached with the routing request & data is transmitted to the terminal mobile communication station from the first departure communication station after an establishment of the routing, and the terminal mobile communication station transmits the packet attached with the property of routing request acknowledge to the first departure mobile communication station when the packet attached with the property of routing request & data is received.

8. A mobile communication station for radio communication by packets, which station comprises a packet reception means, a unique word detection means for detecting a unique word of the received packet, a packet judging means for judging if an address of the received packet is a self relative address or not, or a property of the packet, a packet relay means that transmits the received packet when the received packet is not the self relative address and when the received packet is not identical with a packet received in the past, a packet memory means, a packet reconstitution unit for recording a routing information in the packet when the received packet is not the self relative address and reconstituting the packet, a data generating unit for generating the data of the packet and outputting the data to an output device, a data collection means for collecting the data, a unique word generating means, a packet constitution means for constituting the packet on the basis of signals from the unique word generation means and a signals from the data collection means, a packet transmission means, and a control means for controlling said each means.

9. A mobile communication station according to claim 8, which station is provided with a transmission timing setting means for setting a timing of the packet transmission of the packet transmission means at random, wherein a fluctuation is applied to the beam output that is transmitted from the packet transmission means by means of an antenna.

10. A mobile communication station according to claim 9, wherein the transmission timing setting means is constituted by a random number generator.

11. A mobile transmission station according to claim 8, wherein said station is provided with a wave arriving direction detector for detecting an arriving direction of a packet that is made specific by the unique word, and the arriving direction of the received packet is recognized.

* * * * *